US008482417B2

(12) United States Patent
Stewart (10) Patent No.: US 8,482,417 B2
(45) Date of Patent: Jul. 9, 2013

(54) SYSTEM AND METHOD FOR NETWORK-BASED JUMP AREA MONITORING

(76) Inventor: David Stewart, Zephyr Cove, NV (US)

( * ) Notice: Subject to any disclaimer, the term of this patent is extended or adjusted under 35 U.S.C. 154(b) by 0 days.

(21) Appl. No.: 13/183,559

(22) Filed: Jul. 15, 2011

(65) Prior Publication Data

US 2011/0267189 A1  Nov. 3, 2011

Related U.S. Application Data

(63) Continuation-in-part of application No. 12/412,946, filed on Mar. 27, 2009, now Pat. No. 8,164,472, which is a continuation-in-part of application No. 12/413,072, filed on Mar. 27, 2009.

(60) Provisional application No. 61/115,329, filed on Nov. 17, 2008.

(51) Int. Cl.
*G08B 23/00* (2006.01)

(52) U.S. Cl.
USPC ........ 340/573.1; 340/540; 340/523; 340/670; 340/556; 340/686.1; 348/240.99; 348/157; 280/11; 280/11.36; 280/617

(58) Field of Classification Search
USPC .................. 340/523, 573.1, 556, 686.1, 540, 340/670; 702/158; 280/11, 11.36, 617; 348/240.99, 157
See application file for complete search history.

(56) References Cited

U.S. PATENT DOCUMENTS

| | | | |
|---|---|---|---|
| 3,505,878 A | 4/1970 | Moll | |
| 4,089,057 A | 5/1978 | Eriksson | |
| 4,262,537 A | 4/1981 | Jander et al. | |
| 4,546,650 A | 10/1985 | Cameron | |
| 4,911,005 A | 3/1990 | Heyn et al. | |
| 5,003,820 A | 4/1991 | Dittbrenner | |
| 5,951,357 A | 9/1999 | Mandle et al. | |
| 6,320,515 B1 | 11/2001 | Olsson | |
| 6,433,691 B1 | 8/2002 | Hilliard et al. | |
| 6,533,296 B1 | 3/2003 | Farraday | |
| 6,718,058 B2 * | 4/2004 | Ochi et al. | 382/154 |
| 7,040,994 B2 | 5/2006 | Lochtefeld et al. | |
| 7,414,528 B2 | 8/2008 | Crichton | |
| 7,617,069 B2 | 11/2009 | Alexander et al. | |
| 7,860,666 B2 | 12/2010 | Vock et al. | |
| 8,019,490 B2 * | 9/2011 | Ferren et al. | 701/3 |
| 8,164,472 B2 * | 4/2012 | Stewart | 340/670 |
| 2001/0040996 A1 * | 11/2001 | Ochi et al. | 382/154 |
| 2002/0052236 A1 | 5/2002 | Kohira et al. | |
| 2003/0016160 A1 | 1/2003 | Lok et al. | |
| 2003/0055595 A1 | 3/2003 | Flentov et al. | |
| 2003/0069052 A1 * | 4/2003 | Higashiyama et al. | 463/4 |
| 2004/0075737 A1 | 4/2004 | Kirby | |
| 2006/0167649 A1 | 7/2006 | Alexander et al. | |
| 2006/0187019 A1 | 8/2006 | Crichton | |
| 2007/0026974 A1 | 2/2007 | Marty et al. | |

(Continued)

*Primary Examiner* — Hoi Lau
(74) *Attorney, Agent, or Firm* — Michael A. Kerr; Kerr IP Group, LLC (57) ABSTRACT

A networked jump safety system and method for monitoring a jump area is described. The system comprises a safety analysis station connected via a network to least one monitoring station. The output of a sensor is analyzed at the safety analysis station to determine if it is safe for a rider to enter a jump area. A status corresponding to the determination is transmitted via the network from the safety analysis station to a light emitting output.

12 Claims, 10 Drawing Sheets

U.S. PATENT DOCUMENTS

| | | |
|---|---|---|
| 2007/0032318 A1 | 2/2007 | Nishimura et al. |
| 2008/0027599 A1 | 1/2008 | Logan et al. |
| 2008/0233523 A1* | 9/2008 | Diepenbroek et al. .......... 431/14 |
| 2008/0297304 A1* | 12/2008 | Moscovitch ................... 340/3.1 |
| 2009/0040301 A1* | 2/2009 | Sandler et al. ................ 348/143 |
| 2009/0066490 A1 | 3/2009 | Mitzutani et al. |
| 2010/0078016 A1* | 4/2010 | Andrieux et al. ........ 128/202.22 |
| 2010/0123593 A1* | 5/2010 | Stewart ........................ 340/670 |
| 2010/0123777 A1* | 5/2010 | Stewart ........................ 348/143 |
| 2010/0148483 A1 | 6/2010 | Kopp et al. |
| 2010/0160014 A1 | 6/2010 | Galasso et al. |
| 2010/0197416 A1 | 8/2010 | Brown |
| 2010/0318294 A1 | 12/2010 | Rosing et al. |
| 2011/0071792 A1* | 3/2011 | Miner ........................... 702/182 |
| 2011/0128397 A1* | 6/2011 | Kang ......................... 348/222.1 |
| 2011/0131012 A1 | 6/2011 | Czaja et al. |
| 2011/0169605 A1* | 7/2011 | Gunn ............................. 340/8.1 |
| 2011/0267189 A1* | 11/2011 | Stewart ........................ 340/533 |

* cited by examiner

SYSTEM AND METHOD FOR NETWORK-BASED JUMP AREA MONITORING

CROSS-REFERENCE

This patent application is a continuation-in-part of patent application Ser. No. 12/412,946 filed on Mar. 27, 2009 which claims the benefit of provisional patent application 61/115,329 filed on Nov. 17, 2008;

this patent application is a continuation-in-part of patent application Ser. No. 12/413,072 filed on Mar. 27, 2009 which also claims the benefit of provisional patent application 61/115,329 filed on Nov. 17, 2008; and the above patent applications hereby incorporated by reference in this patent application.

FIELD OF THE INVENTION

The present invention relates to a jump safety system and method for monitoring jump safety. More particularly, the system and method use networked stations to monitor a jump area, determine a safety status and communicate a safety status.

BACKGROUND

Snow sports such as skiing and snowboarding are popular sports with continuously evolving technology and practices. One common activity in snow sports is taking a "jump." To use a jump, the rider approaches the jump area at high speed. The rider leaves the snow at the edge or lip of the jump, continues through the air, and ideally lands in the "landing area." The landing area is a sloped surface designed to minimize impact force upon landing. A jump area generally comprises an angled jump where the rider actually leaves the snow, the tabletop or gap, the landing area, and the run-out area.

The jump may be part of a ski run or a terrain park. A terrain park is an area of a snow resort that includes designed features analogous to a skate park, allowing skiers, snowboarders and the like (referred to as "riders") to perform tricks including grinds, taps, and jumps in a similar fashion to skateboarders.

There are hazards associated with the use of jumps. One is that the landing area is not usually visible from the lip of the jump. Additionally, obstructions in the landing area pose a high risk of injury to the rider, who cannot substantially adjust jump trajectory after leaving the surface of the snow.

The most common obstructions found in the landing area are spectators and other riders. Sometimes uninformed people wander into the landing area because they simply do not understand the safety risk they are posing to themselves and to others. Other times a rider may be too injured to clear the landing area quickly, or at all.

One solution to this problem is to use a spotter. A spotter is a person who stands near the jump in such a way as to see whether there are obstructions in the landing area and signals to waiting riders to go when the area is clear. However, while many resorts provide terrain parks with jumps, few provide spotters for jumps. An automated system that can detect the presence of people and other obstructions in the landing area and convey that information to waiting riders is needed.

Another hazard associated with jumps is speed. If the rider is not moving at an appropriate speed when airborne, the rider may land in an area other than the landing area. If the rider is moving too slowly, the jump may not be 'cleared', resulting in the rider missing the landing area short and instead landing in the tabletop or gap area. If the rider is moving too fast, the jump may extend past the sloped landing area, causing the rider to land in the flatter run-out area. Landing in either of these areas subjects the rider's body to much higher impact forces than landing in the appropriately sloped area. It is largely left to the rider's experience to determine whether a given speed is safe for a given jump.

When a ski area features multiple jumps or a jump area that requires monitoring from multiple perspectives, it may be burdensome to assess jump safety at each monitoring point. It is thus desirable to connect the monitoring points via a network so that the safety assessment may occur at a single assessment station that receives information from each of the monitoring points.

Several U.S. Patents, including U.S. Pat. Nos. 3,505,878; 4,546,650; 5,003,820; 6,533,296; and 4,262,537 disclose ski-mounted devices that can measure speed, but these systems cannot effectively convey information in real time because the displays are mounted on the ski device or on the rider, making them difficult, and perhaps even dangerous, to view while actively skiing or snowboarding. Further, these systems do not provide information about an optimal speed range in relation to a jump.

In U.S. Pat. No. 7,414,528, an automated system for improving skier safety is described. This system is configured to detect a skier's entrance into and departure from a jump area, which allows the system to report when a skier has failed to leave the landing area. However, information about other obstructions or hazards that may be present in the landing area is not available. Further, this system does not detect people that have wandered into the jump landing area from an area other than the location of the jump. Moreover, this system lacks a network to centralize safety assessment processes for data received from multiple monitoring points.

SUMMARY

A networked jump safety system for monitoring a landing area associated with a jump is described. The system comprises at least one monitoring station, comprising a camera positioned to generate a camera output that displays the landing area. The monitoring station also comprises a monitoring station network interface device. The system further comprises a light emitting output that displays a status to a rider approaching the jump. The system also comprises a safety analysis station. The safety analysis station comprises a safety analysis station network interface device communicatively coupled to the monitoring station network interface device. A memory is configured to receive the camera output via the safety analysis station network interface device. A processor analyzes the camera output received in the memory. An image processing module controlled by the processor returns a first status when the image processing module determines that no obstructions are found in the camera output and returns a second status when the image processing module determines that obstructions are found in the camera output. The image processing module communicates the returned status to the light emitting output.

In another embodiment, a networked jump safety system for monitoring an approach to a jump is described. The system comprises at least one monitoring station, comprising a speed assessment component configured to generate a speed output corresponding to the speed of a rider approaching the jump. The monitoring station also comprises a monitoring station network interface device. The system further comprises a light emitting output that displays a status to a rider approaching the jump. The system also comprises a safety analysis station. The safety analysis station comprises a safety analysis station network interface device communicatively coupled to the monitoring station network interface device. A memory is configured to receive the speed output via the safety analysis station network interface device. A processor analyzes the speed output received in the memory. A speed safety analysis module controlled by the processor returns a first status when the speed safety analysis module determines that the speed falls below a predetermined optimal speed range and returns a second status when the speed safety analysis module determines that the speed exceeds a predetermined optimal speed range. The speed safety analysis module communicates the returned status to the light emitting output.

A networked jump safety method for monitoring a landing area associated with a jump is also described. The method comprises transmitting a camera output from a camera positioned to generate a camera output that displays the landing area. The camera output is received at a memory via a network and is analyzed with a processor. An image processing module controlled by the processor determines whether an obstruction is detected in the camera output. A status is transmitted from the image processing module to the light emitting output via the network, and the status is indicated with the light emitting output.

A networked jump safety method for monitoring an approach to a jump is also described. The method comprises transmitting a speed output from a speed assessment component configured to generate a speed output corresponding to the speed of a rider approaching the jump. The speed output is received at a memory via a network and analyzed with a processor. A speed safety analysis module controlled by the processor determines whether the speed output falls within a predetermined optimal speed range. A status is transmitted from the speed safety analysis module to a light emitting output via the network, and the status is indicated with the light emitting output.

DRAWINGS

The present invention will be more fully understood by reference to the following drawings which are for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus and systems described herein may vary as to configuration and as to details. Additionally, the methods may vary as to details, order of the actions, or other variations without departing from the illustrative method disclosed herein.

A network-based jump safety system and method are described. The jump safety system comprises a safety analysis station and at least one monitoring station. Each monitoring station is communicatively coupled via a network to the safety analysis component. The monitoring station may comprise an obstruction monitoring component, such as a camera, positioned to capture images of a jump area. Alternatively, the monitoring station may comprise a speed assessment component such as a radar component, positioned to detect the speed of a rider approaching a jump.

In some embodiments, the means for determining speed may comprise multiple cameras on successive monitoring stations. Image processing is used to determine whether the same rider is detected by a first camera at a first monitoring station and subsequently detected by a second camera at a second monitoring station. The speed of the rider is determined based on a known distance between monitoring stations and the elapsed time between detection of the rider by the first camera and detection of the rider by the second camera.

The monitoring station may be a stationary tower or a mobile station. A monitoring station comprises both a camera and a radar component. Data is communicated from each camera and radar component via a network to the safety analysis station. The safety analysis station is a computing device, such as a server, typically located at the base of a ski area. Alternatively, a safety analysis station is located at a monitoring station. In some embodiments, each monitoring station comprises a safety analysis station.

An image processing module running on the safety analysis station analyzes image data received from the camera to determine whether an obstruction is present in the monitored area. If an obstruction is detected, the image processing module communicates a signal indicating a warning status via the network to a light emitting output visible to riders approaching the jump. If no obstruction is detected, the image processing module communicates a signal indicating a safe status to the light emitting output.

A speed safety analysis module running on the safety analysis station analyzes the data received from the radar component to determine whether the speed at which the rider is approaching the jump falls within a predetermined safe speed range. The terms "safe speed range" and "optimal speed range" are used interchangeably to indicate a speed range at which a rider may safely approach a jump. If the speed of the rider falls below the safe speed range, the speed safety analysis module communicates a signal indicating an increase speed status via the network to a light emitting output visible to riders approaching the jump. If the speed of the rider exceeds the safe speed range, the speed safety analysis module communicates a signal indicating a decrease speed status to the light emitting output.

In another embodiment, if the speed of the rider falls within a safe speed range, the speed safety analysis module communicates a signal indicating a safe status. If the speed of the rider does not fall within the safe speed range, the speed safety analysis module communicates a signal indicating a warning status.

In some embodiments, the speed safety analysis module uses image processing to detect the rider at successive cameras in order to determine the speed of the rider.

Figure 1:
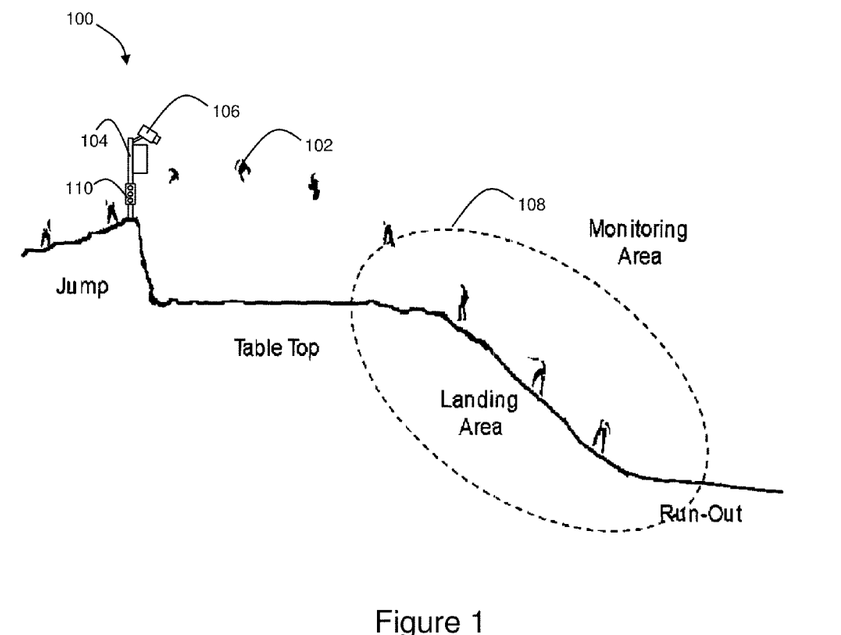
FIG. 1 shows a side view of an illustrative jump area.

Referring to FIG. 1, there is shown a side view of an illustrative jump area 100. A rider 102 is shown progressing along the jump area. A typical jump area comprises the ramp surface or "jump", a flat surface referred to as a "table top," a downhill surface on which the rider may land safely, and a run-out area where the rider may slow down or safely come to a stop. Illustrative monitoring station 104 comprises camera 106. The monitoring station is positioned such that images captured by the camera include any part of the jump area in which an obstruction would endanger riders. For example, the camera may be positioned to capture monitoring area 108, which comprises all or part of the landing area and may also include portions of the tabletop or run-out areas. The terms "landing area" and "monitoring area" are used interchangeably to refer to the area monitored by the camera. Multiple monitoring stations may be required to capture the entirety of a monitoring area. It will be recognized that the monitoring station may be configured to check for obstructions in jump areas having configurations that differ from that shown in FIG. 1.

Alternatively, when the camera is used for speed monitoring, the camera is positioned such that images captured by the camera include a rider approaching the jump.

In some embodiments, monitoring station 104 comprises a radar component in lieu of or in addition to camera 106. The radar component is positioned to detect the speed of the rider as the rider approaches the jump.

Light emitting output 110 is positioned to be visible to riders as they approach the jump. The light emitting output comprises at least one lighted indicator. For example, the light emitting output may comprise a red light that is illuminated when the light emitting output receives a warning status from the image processing analysis module or the speed safety analysis module, indicating that it is unsafe for riders to enter the jump area. When the red light is not illuminated, riders may safely enter the jump area. In another embodiment, the light emitting detector comprises two indicators, the first indicator (e.g., a green light) indicating that it is safe for riders to proceed into the jump area and the second indicator (e.g., a red light) indicating that it is unsafe to enter the jump area. In a further embodiment, the light emitting detector comprises three indicators, with a third indicator (e.g., a orange light) indicating that riders entering the jump area should proceed with caution. The caution status may be triggered by a variety of conditions such as poor weather visibility, changes to snow, an icy landing area, and other such instances that may trigger a caution status.

The light emitting output may alternatively or additionally present text, symbols, or other indicia to provide information to riders. For example, the light emitting output may comprise a first indicator that is illuminated when the light emitting output receives an increase speed status from the speed safety analysis module, indicating that the rider must increase speed to safely enter the jump area and a second indicator that is illuminated when the light emitting output receives a decrease speed status from the speed safety analysis module, indicating that the rider must decrease speed to safely enter the jump area. The indicator may be, for example, text indicating that the rider should increase speed, a symbol such as an up arrow, or a number indicating the current speed of the rider, or other information. The indicator may additionally use color to communicate status information, such as displaying red text, symbol, or speed readout when a decrease speed status is indicated and displaying green text, symbol, or speed readout when an increase speed status is indicated. In a preferred embodiment, the light emitting output comprises an up arrow that is illuminated when the rider speed falls below a safe speed range, a down arrow that is illuminated when the rider speed exceeds a safe speed range, and a checkmark that is illuminated when the rider speed falls within a safe speed range. In some embodiments, the light emitting output simply presents a number indicating the speed of the rider approaching the jump.

The term "illuminate" as used herein may refer to activating lighting located proximate to a transparent panel, displaying on a display such as an LCD display or digital billboard, or other means of displaying information.

The light emitting output may be located on a tower that is separate from the monitoring station tower.

When multiple cameras are used to monitor the monitoring area, if an obstruction is detected by any camera, the light emitting status will receive a warning status.

Figure 2:
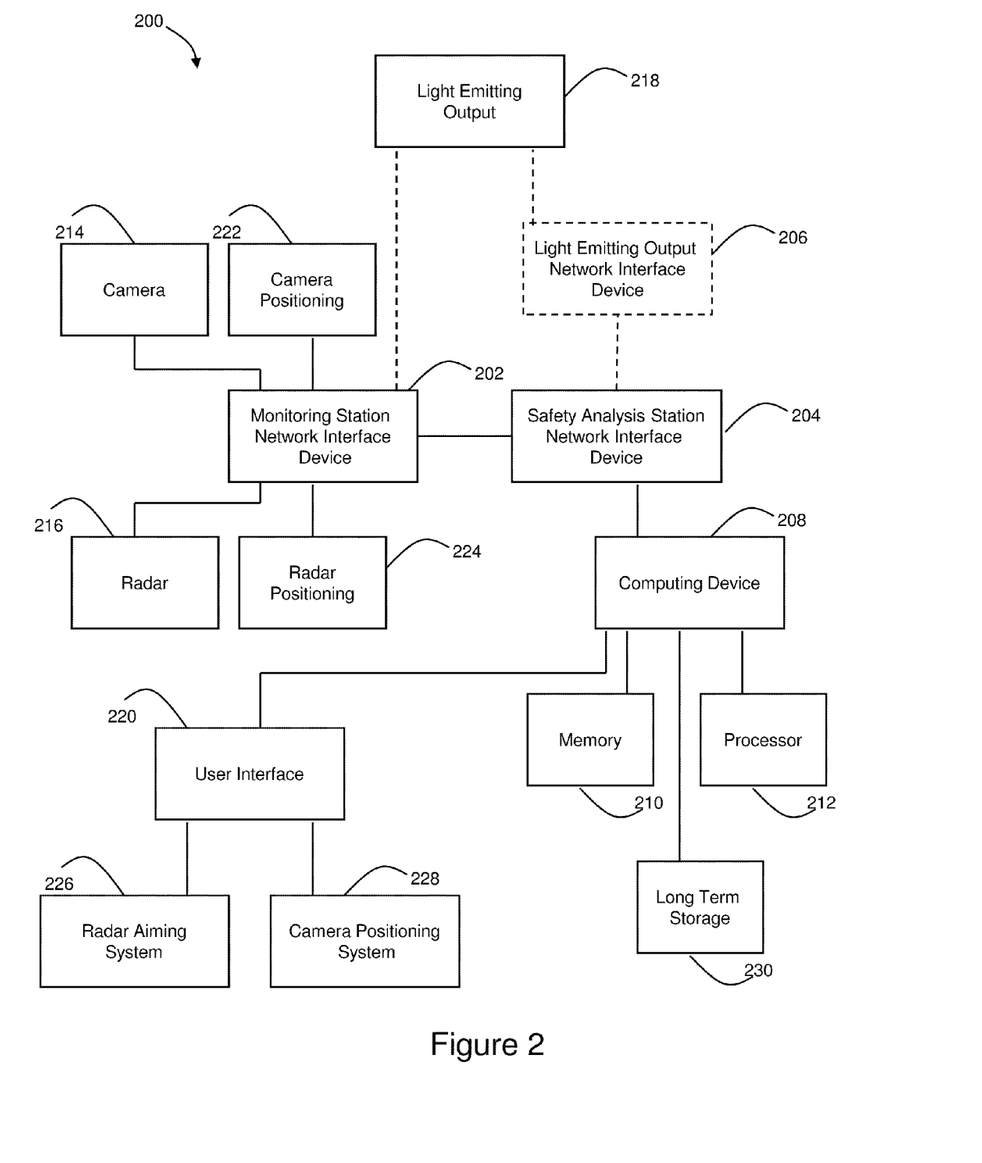
FIG. 2 shows an illustrative network-based jump safety system diagram for monitoring jump area safety.

Referring to FIG. 2, there is shown an illustrative network-based jump safety system diagram 200 for monitoring jump area safety. The jump safety system 200 comprises at least one monitoring station network interface device 202 communicatively coupled to safety analysis station network interface device 204. The network interface device is any device that enables the device to receive communications via a network, such as a network switch, wireless access point, radio node, or modem. If the light emitting output is located on a separate tower from the monitoring station tower, optional light emitting output network interface device 206 may be used. The light emitting output network interface device receives signals from the safety analysis station network interface device indicating the output to be displayed on the light emitting output.

The network interface devices may be communicatively connected to one another via a wired connection, such as Category 5 or Category 6 network cable or fiber. In another embodiment, the network interface devices are communicatively connected via a wireless connection, such as a local area network (LAN) or wide area network (WAN) using Wi-Fi or other 802.11x technology.

The safety analysis station network interface device 204 is communicatively coupled to computing device 208. The computing device comprises a memory 210 and a processor 212. Memory 210 is temporary data storage, such as RAM, that receives data from camera 214 and radar component 216 via monitoring station network interface device 202. An image processing module running on processor 212 performs analysis on images stored in memory to determine if an obstruction exists in the area monitored by the camera. The image processing module may be programmed using MAT-LAB® or other such image processing software that enables the monitoring area 108 to be analyzed on a real-time basis to determine whether or not there is an obstruction in the monitoring area. Image processing techniques may include, but are not limited to, examining the image for a high concentration of closely grouped pixels with color saturation above a pre-selected threshold. Analysis techniques may also include comparing average light intensity between images. An illustrative process for image processing is described in FIG. 9. If an obstruction is detected by the image processing module, the module transmits a warning status to light emitting output 218 via safety analysis station network interface device 204. If no obstruction is detected, a safe status is transmitted to the light emitting output.

A speed safety analysis module running on processor 212 determines whether the rider speed detected by radar component 216 falls within a safe speed range for the jump monitored by the radar component. If the speed exceeds the safe speed range, the module transmits a decrease speed status to light emitting output 218 via safety analysis station network interface device 204. If the speed falls below the safe speed range, an increase speed status is transmitted to the light emitting output.

In some embodiments, the speed safety analysis module uses image processing applied to the output from two or more cameras to determine the speed of the rider. A first camera output is analyzed to identify a rider. The output from a second camera, typically located downhill from the first camera, is analyzed to determine if the same rider is detected by the second camera. The speed of the rider is calculated by dividing the known distance between the first camera and the second camera by the time elapsed between the detection of the rider at the first camera and the second camera.

Light emitting output 218 may be communicatively coupled to the monitoring station network interface device 202, typically when the light emitting output is mounted on the monitoring station tower. In this case, output from the speed safety analysis module and image processing module is communicated to safety analysis station network interface device 204 via computing device 208, which in turn transmits the commands to the light emitting output 218 via monitoring station network interface device 202. In another embodiment, the light emitting output 218 is communicatively coupled to the light emitting output network interface device 206, typically when the light emitting output is mounted separately from the monitoring station tower. In this case, output from the speed safety analysis module and image processing module is communicated to safety analysis station network interface device 204 via computing device 208, which in turn transmits the commands to the light emitting output 218 via light emitting output network interface device 206.

In some embodiments, the computing device comprises user interface 220. The user interface allows the user to control the positioning of the camera 214 by issuing commands to camera positioning component 222. The user interface may also allow the user to control the positioning of radar component 216 by issuing commands to radar positioning component 224. The user interface may additionally allow the user to enter or adjust user-selected parameters to be used by the image processing module and speed safety analysis module. For example, the user may enter or adjust the lower speed and upper speed to be associated with the safe speed range or the object size to be associated with obstruction detection (or with rider detection for speed determination). The user interface typically comprises a display, for example, a monitor, and an input device, such as a keyboard and mouse. Alternatively, the user interface may comprise a combined display and input device, such as a touchscreen.

Camera 214 is communicatively coupled to monitoring station network interface device 202. The camera is a weatherproof camera that captures still images or video. Camera positioning component 222 is operatively coupled to camera 214 and controls settings comprising the pan, tilt, and zoom of the camera. Additionally, the camera positioning component 222 may be configured to control camera altitude on the mounting tower by controlling a motor that can move the mounting tower to the desired elevation. The user may adjust one or more of the settings using the camera positioning system 228 of the user interface 220. In one illustrative embodiment, the camera positioning component uses laser pointers mounted on or near the camera to delineate the corners of the monitoring area on the ground. In some embodiments, the user may view the camera image on the display of the user interface. The user may be able to select a user-defined monitoring area, e.g. a window, within the display. The commands received at user interface 220 are communicated to safety analysis station network interface device 204 via computing device 208, which in turn transmits the commands to camera positioning component 222 via monitoring station network interface device 202.

Radar component 216 is communicatively coupled to monitoring station network interface device 202. The radar component transmits and receives radio signals and generates a speed output. The radar component may be, for example, a radar gun. Radar aiming system 226 is operatively coupled to radar component 216 and controls the aim of the radar component. The user may adjust the aim of the radar component using the radar aiming system 226 of the user interface 220. The commands received at user interface 220 are communicated to safety analysis station network interface device 204 via computing device 208, which in turn transmits the commands to radar positioning component 224 via monitoring station network interface device 202.

In some embodiments, the camera is integrated with the network interface device. For example, a network interface device may comprise a network interface running on a processor, and a camera communicatively coupled with and mounted on the processor. The radar component may be similarly integrated with the network interface device.

The computing device 208 may comprise long term storage 230. The long term storage may be, for example, a hard drive or hard drive array. The long term storage allows images or video captured by the camera or speed data calculated by the speed safety analysis module to be archived. It may be desirable to retrieve archived images, video or speed data for use as evidence in the case that an injury claim arises from a jump injury.

Figure 3:
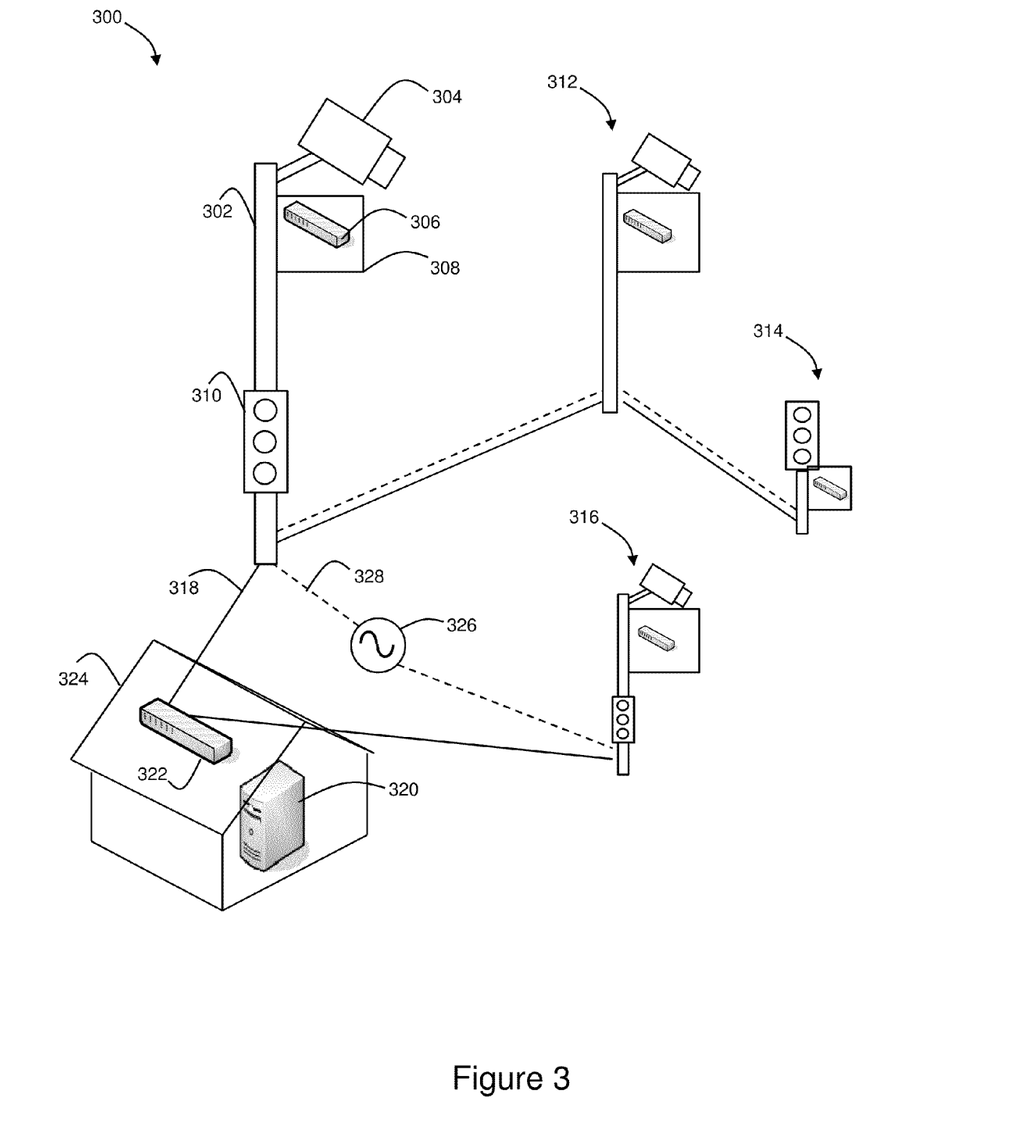
FIG. 3 shows an illustrative jump area monitoring system using a wired network.

Referring now to FIG. 3, there is shown an illustrative jump area monitoring system 300 using a wired network. Monitoring station 302 is a stationary tower comprising a camera 304 and monitoring station network interface device 306. In other embodiments, the stationary tower may comprise a radar component in lieu of or in addition to camera 304. The network interface device is housed in weatherproof container 308. The weatherproof container may be mounted on or located adjacent to the monitoring station tower. In some embodiments, a light emitting output 310 is coupled to the monitoring station. In other embodiments, the light emitting output is located on a light emitting output station 314 located remote from the monitoring station as shown at 312. Light emitting output station 314 may comprise light emitting output network interface device 324. The monitoring stations may be wired for signal and power in series as shown at 302 and 312 or in parallel as shown at 302 and 316. Combinations of serial and parallel wiring may be used where desirable, for example, due to terrain constraints.

Safety analysis station 324 receives signals from each of the monitoring stations at safety analysis station network interface device 322 via network cable 318. The safety analysis station is typically located in a building or weatherproof container at the base of the mountain. The safety analysis station comprises computing device 320 communicatively coupled to safety analysis station network interface device 322.

The network cable is any cable capable of carrying a signal, such as Category 5 or Category 6 cable or fiber. The cable may be run in waterproof flexible conduit to protect the cable from the elements. Alternatively, outdoor rated cable or direct burial cable may be used. The cable may be trenched and buried. If the distance of the cabling or fiber run is less than a maximum distance over which network communications can be propagated ("maximum communication distance"), e.g. 328 feet, then network cable may connect the network interface devices directly. If the cabling or fiber run is more than the maximum communication distance, a network extender such as a DSL modem may be used for connectivity.

Each monitoring station receives power via power lines 328, indicated with a dotted line. The power lines may be located in the same trenching as the network cable or may be run separately. Typically, alternating current power is provided to the monitoring stations from alternating power source 326. Monitoring stations may alternatively or additionally receive power from one or more power sources remote from the image processing tower. For example, the wired network monitoring stations may have solar power devices, batteries or generators to provide power to the stations. The wired network monitoring stations may comprise batteries to store excess electricity produced by the solar panels. By way of example and not of limitation, the battery backup is capable of supplying power for 8-12 hours when inclement weather may prevent the solar panels from supplying power for an extended period.

Figure 4:
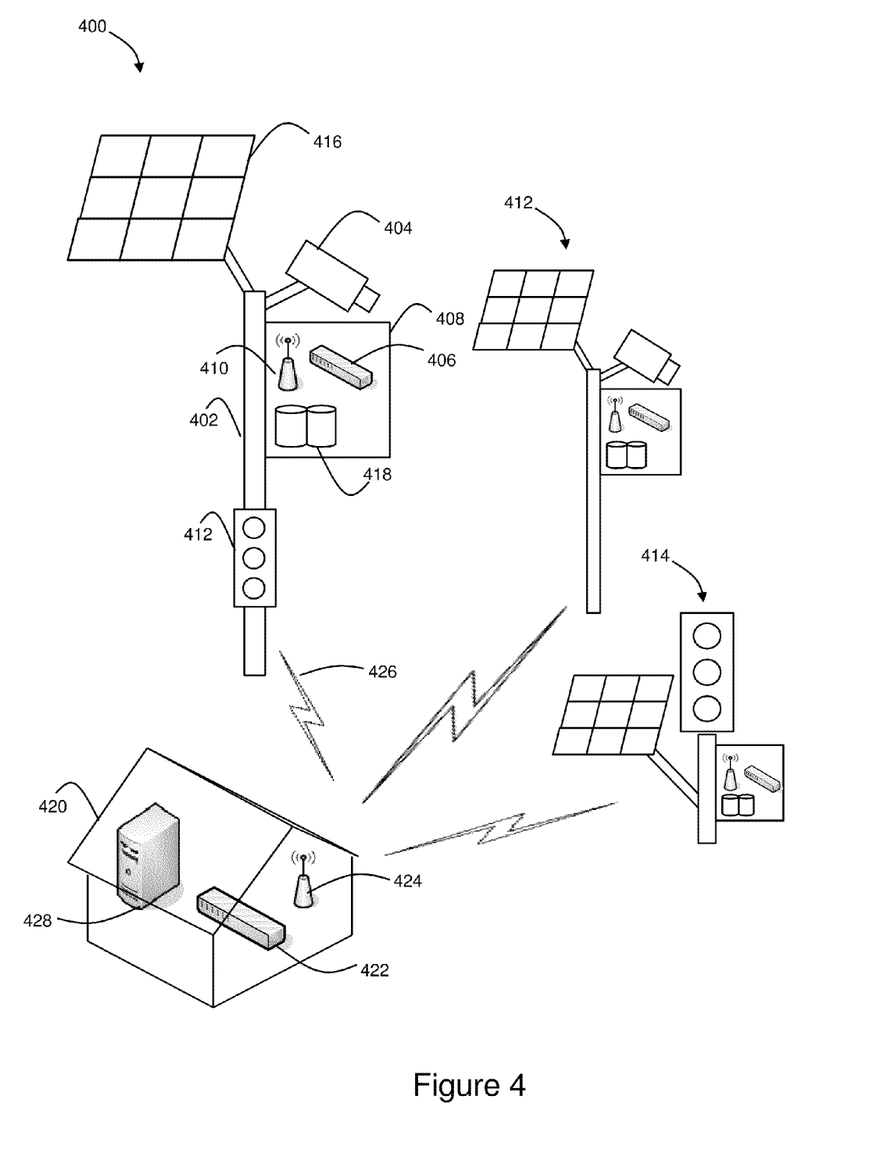
FIG. 4 shows an illustrative jump area monitoring system using a wireless network.

Referring to FIG. 4, there is shown an illustrative jump area monitoring system 400 using a wireless network. Monitoring station 402 is a stationary tower comprising a camera 404 and monitoring station network interface device 406. In other embodiments, the stationary tower may comprise a radar component in lieu of or in addition to camera 404. The network interface device is housed in weatherproof container 408. The network interface device is communicatively coupled to wireless subscriber unit 410, which may also be located within weatherproof container 408. The weatherproof container may be mounted on or located adjacent to the monitoring station tower. In some embodiments, a light emitting output 412 is coupled to the monitoring station. In other embodiments, the light emitting output is located on a light emitting output station 414 located remote from the monitoring station as shown at 412.

The monitoring station further comprises solar panel 416. Excess electricity produced by the solar panel is stored in batteries 418, which may be housed in the weatherproof container 408. In an alternative embodiment, the monitoring station may receive power from a generator or from an alternating current source via power line.

Safety analysis station 420 receives signals from each of the monitoring stations at safety analysis station network interface device 422 via wireless access point 424. Wireless access point 424 communicates with each wireless subscriber device 410 via wireless bridge 426. In some embodiments, multiple wireless access points may be required at the safety analysis station to ensure communications with each of the wireless subscriber devices. For example, multiple wireless access points may be required when the terrain interferes with the line of sight between a wireless access point and a wireless subscriber device. The safety analysis station comprises computing device 428 communicatively coupled to safety analysis station network interface device 422.

Figure 5:
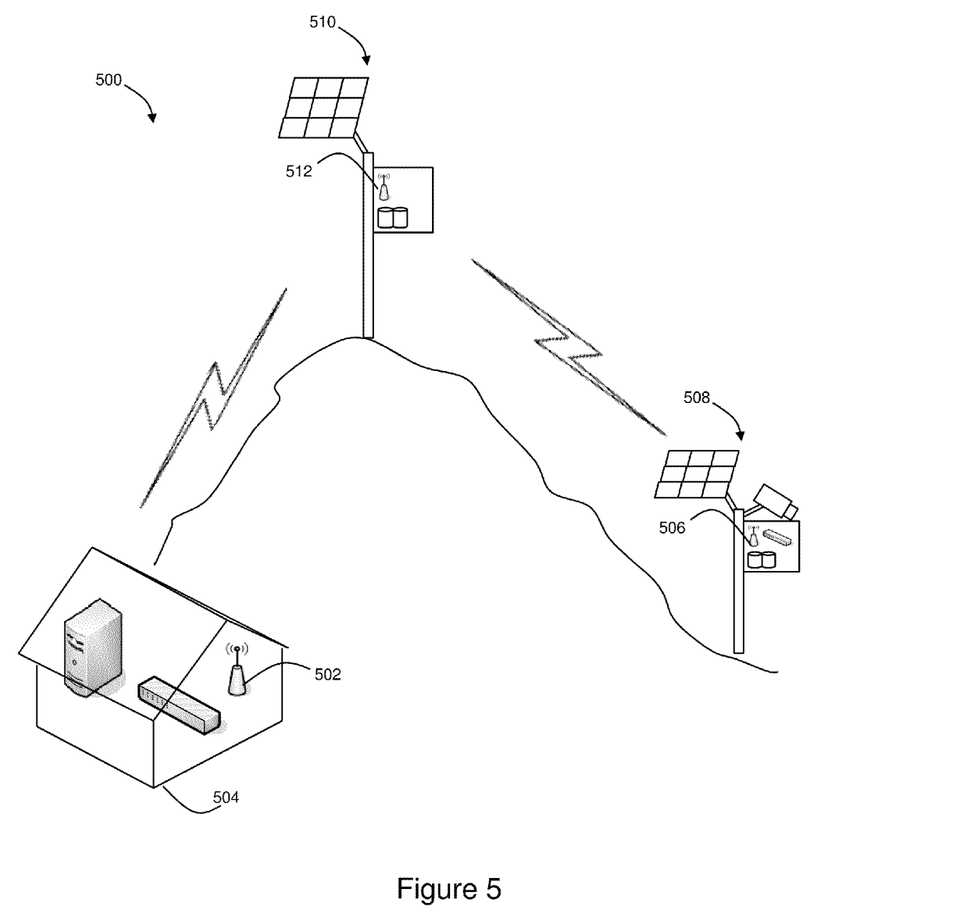
FIG. 5 shows a jump area monitoring system including an illustrative relay station.

Referring now to FIG. 5, a wireless jump monitoring system 500 including an illustrative relay station is shown. In FIG. 5, the terrain blocks the line of sight between wireless access point 502 at safety analysis station 504 and wireless subscriber device 506 at monitoring station 508. Relay station 510 comprises wireless repeater 512 that relays a signal between wireless subscriber device 506 and wireless access point 502.

Figure 6:
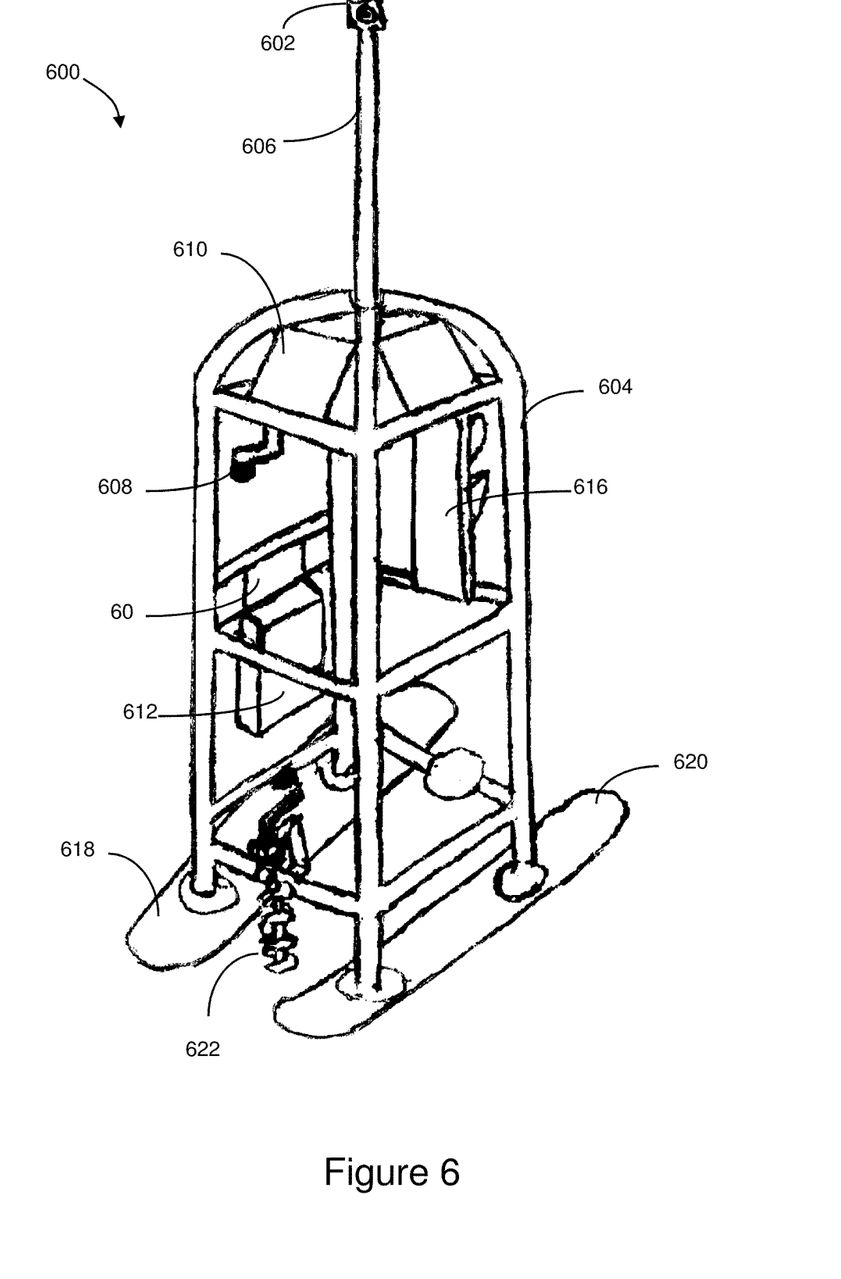
FIG. 6 shows an illustrative mobile monitoring station.

Referring to FIG. 6, an illustrative mobile monitoring station 600 is shown. A mobile monitoring station may be used in lieu of any of the stationary monitoring stations shown in FIGS. 3, 4 and 5. The mobile monitoring station may comprise a camera 602 mounted on the weatherproof housing 604 atop a mounting pole 606. In other embodiments, the mobile monitoring station may comprise a radar component in lieu of or in addition to camera 602. Mounting pole 606 may be extensible using hand crank 608. In operation, hand crank 608 can be turned manually to raise pole 606, allowing the camera to be positioned at a high vantage point to gain a better view of the monitoring area. In other embodiments, pole 606 may be remotely controlled to extend in response to commands received from a user interface 220 communicated to the mobile monitoring station via a safety analysis station network interface device 204 in communication with a monitoring station network interface device 202 of the mobile monitoring station 600.

The mobile monitoring station also includes a local power supply that delivers power to the powered components of the mobile monitoring station. The illustrative power supply may include solar panels 610 that are mounted around the top of the frame. The solar power supply also may include a battery back-up system 612 that is capable of providing power to the system for 8-12 hours.

In this illustrative embodiment, the camera is operatively coupled to a camera aiming system that includes a weatherproof LCD screen 614. The screen 614 displays the output of camera 602 and aids the user in establishing or correcting the monitoring area that is analyzed using camera 602. Alternatively, the camera may be positioned remotely using user interface 220. By way of example and not of limitation, beneath the screen is a computer housing 612 that includes a microprocessor and memory and battery back-up system. The computer housing may include a "Tiny PC", which refers to the PC being both compact in size and solid state. The computer housing 612 is also mounted in a weatherproof housing and is communicatively coupled to the camera 602 by Ethernet cable, USB connection, or any other video to PC capture device. The computer housing 612 is also communicatively coupled to a light emitting output 616. In this illustrative embodiment, the light emitting output 616 is an energy-efficient LED stoplight style display signal.

In some embodiments, in lieu of an on board computer housing, the mobile monitoring station comprises mobile monitoring station network interface device (not shown) and mobile monitoring station wireless subscriber device (not shown) that allow communications with the mobile monitoring station from the user interface 220 via safety analysis station network interface device 204. The mobile monitoring station may be located in a weatherproof housing coupled to the mobile monitoring station, for example, housing 612. Camera and radar positioning, image and radar safety analysis processing, and light emitting display control may be performed through the network link.

A surface positioning component 618 is mounted on the bottom of the integrated weatherproof housing 604. The surface positioning component 618 enables the jump safety apparatus 600 to be moved easily over snow and placed into a particular position for use. In this illustrative embodiment, the surface positioning component 618 includes a pair of skis 620 and snow screw 622. Once maneuvered into the desired position to monitor the jump, surface positioning component 618 allows the jump safety apparatus 600 to be firmly fastened into place with the snow screw 622.

Figure 7:
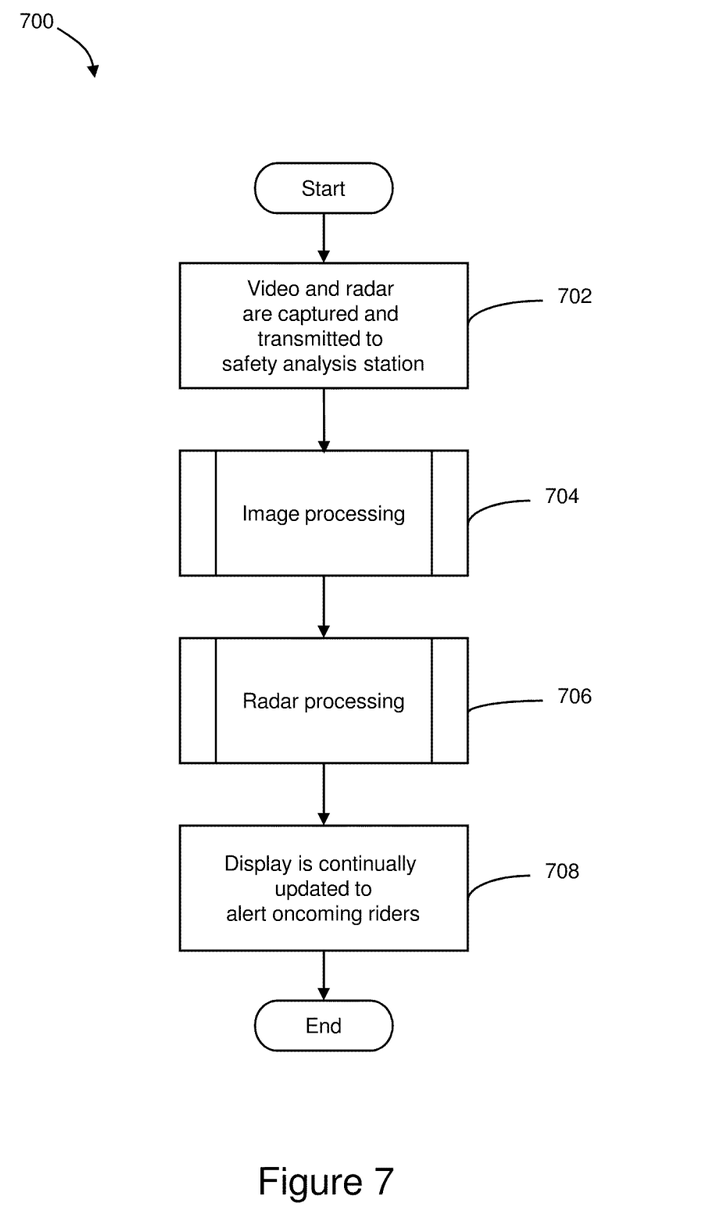
FIG. 7 shows an illustrative high-level flow chart of a method for performing the jump area monitoring system operations.

Referring to FIG. 7, there is shown an illustrative high-level flow chart 700 of a method for performing the jump area monitoring system operations. The method 700 is initiated at block 702 where either images from camera 214, or speed information from radar 216, or the combination thereof is captured by the monitoring station 104. As the data is captured, it is streamed via the network from each monitoring station to computing device 208 of the safety analysis station.

In one embodiment, the method then proceeds to block 704 where image data is processed to monitor the landing area associated with the jump. Images captured by the camera are analyzed to determine whether obstructions exist in the monitored area. In another embodiment, images from multiple cameras are analyzed to determine the speed of the rider. An illustrative method for the image analysis is described with reference to FIG. 9.

The method may then proceed to block 706 where the speed processing module may process data from radar component 216 or from cameras 214. The operations associated with radar processing at block 706 may occur independently of the image processing operations at block 704. The operations at block 704 and 706 may also occur in parallel.

The method then proceeds to block 708 in which a light emitting output, e.g. display, communicates either a landing area safety status, or a jump speed safety status, or a combination thereof. The landing area safety status and/or jump speed safety status may be updated continually, for example, ten times per second to once every ten seconds, e.g., once a second. Thus, with respect to the landing area status, either the warning status or the safe status is communicated to the light emitting output 218 at block 708. With respect to the jump speed safety status, either the warning status or safe status is communicated to the light emitting output 218 at block 708.

Figure 8:
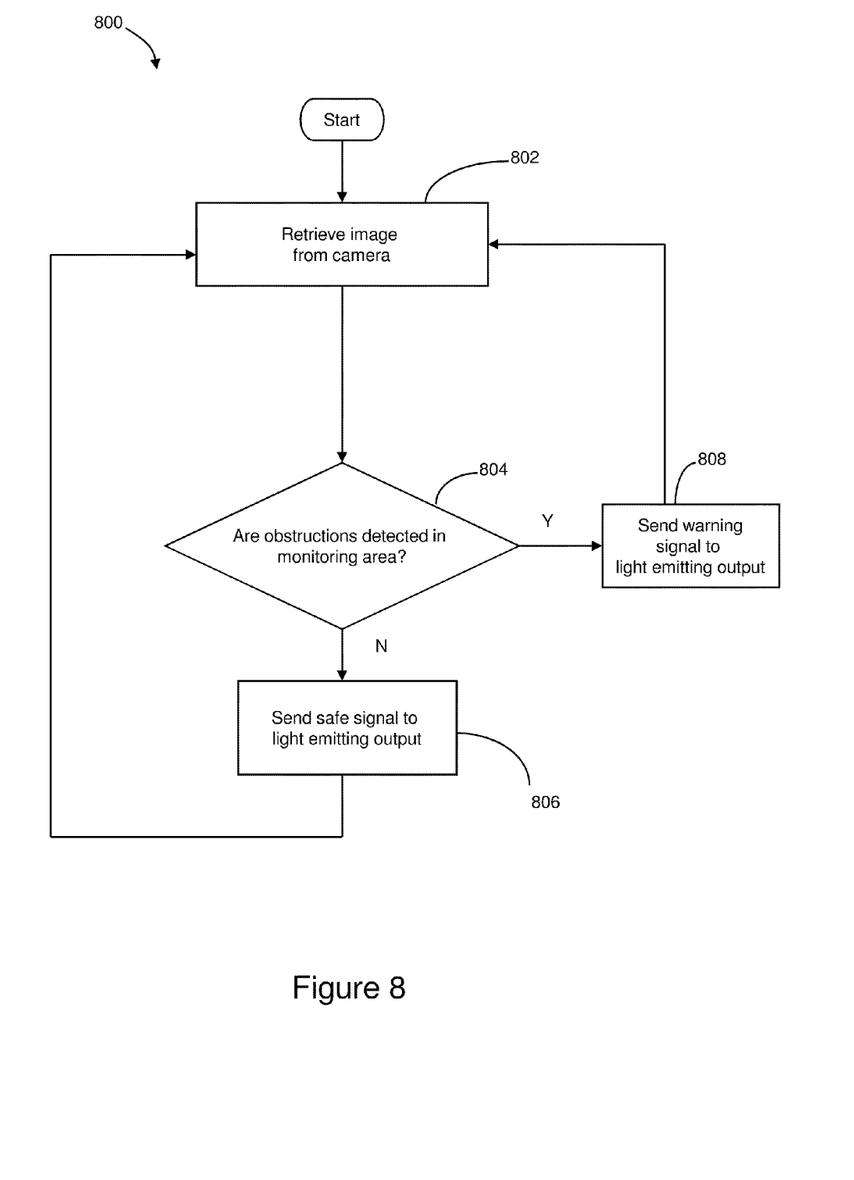
FIG. 8 shows a flow chart of an illustrative method for monitoring a landing area associated with a jump.

Referring to FIG. 8, there is shown a flow chart of an illustrative method 800 for monitoring a landing area associated with a jump. By way of example and not of limitation, the illustrative method 800 corresponds to the image processing module associated with image processing operations in block 704 of FIG. 7. The illustrative method is initiated at block 802 where one or more images are retrieved from camera 214.

At decision diamond 804, the images are analyzed by the processor 212 using the image processing module. A determination is made as to whether the image is free of obstructions in monitoring area 108. If no obstructions are detected in the image, a safe signal is sent to light emitting output 218, as indicated at block 806. If obstructions are detected, a warning signal is sent to the light emitting output, as indicated at block 808.

Figure 9:
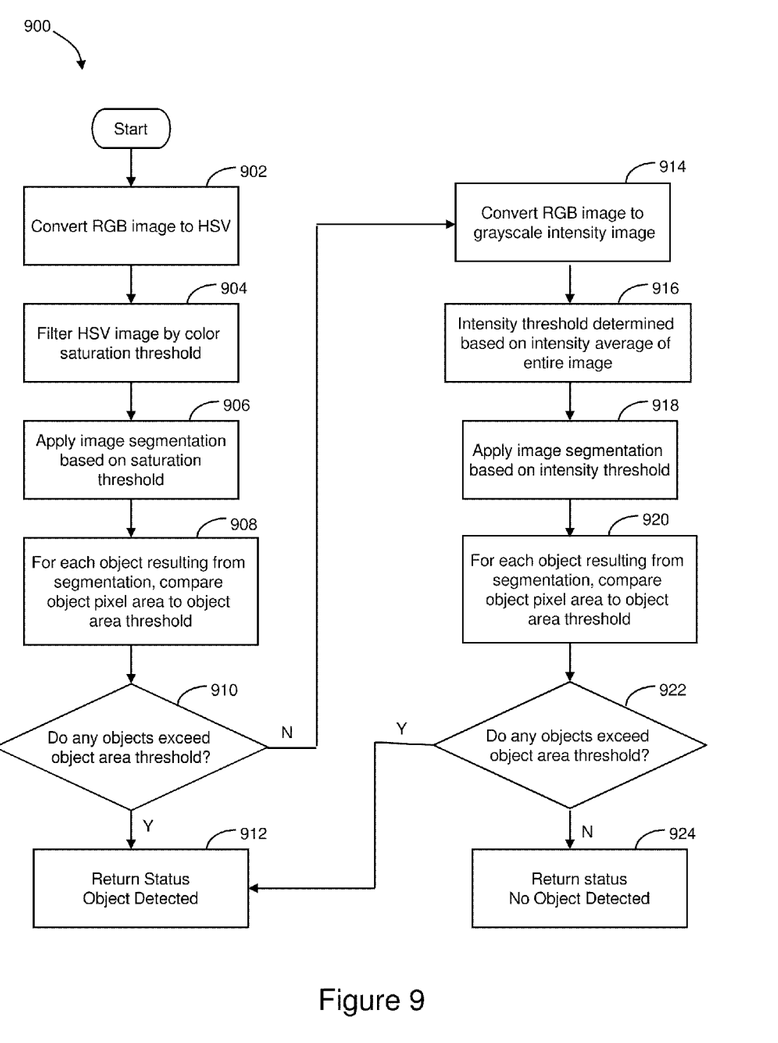
FIG. 9 shows a flow chart of an illustrative image processing module.

Referring to FIG. 9, there is shown a flow chart of an illustrative image processing module 900 for monitoring a landing area associated with a jump. By way of example and not of limitation, the illustrative method 900 corresponds to the obstruction monitoring operations in decision diamond 804. The method begins at block 902, in which the RGB (red green blue) image typically produced by a camera is transformed to an HSV (hue saturation value) image. The HSV image is then filtered by color saturation threshold, as indicated at block 904. The threshold may be a preset value or may be determined for each image based on the image characteristics. For example, in some embodiments, the saturation threshold is set at or related to an average saturation value. At block 906, image segmentation is performed. For each object resulting from the segmentation, the pixel area of the object is compared to an object area threshold, as indicated at block 908. The object area threshold may be, for example, a preset or user-adjustable value. In this manner, it is determined whether an object (such as a rider or equipment) in the monitoring area that stands out visibly from the snow is a large enough obstruction, as measured in pixels in the captured image, to present a danger to a rider approaching a jump. At decision diamond 910, it is determined whether any objects exceed the object area threshold. If an object in the image has a number of pixels exceeding the threshold, the image processing module returns a warning status, as indicated at block 912. If no object exceeds the object area threshold, the method continues to block 914.

At block 914, the RGB image is converted to a grayscale intensity image. The intensity threshold of the image is then determined based on the intensity average of the entire image, as indicated at block 916. At block 918, image segmentation is applied based on the intensity threshold determined in block 916. For each object resulting from the segmentation, the pixel area of the object is compared to an object area threshold, as indicated at block 920. The object area threshold may be, for example, a preset or user-adjustable value. In this manner, it is determined whether an object (such as a rider or equipment) in the monitoring area that stands out visibly from the snow is a large enough obstruction, as measured in pixels in the captured image, to present a danger to a rider approaching a jump. At decision diamond 922, it is determined whether any objects exceed the object area threshold. If an object in the image has a number of pixels exceeding the threshold, the image processing module returns a warning status, as indicated at block 912. If no object exceeds the object area threshold, the image processing module returns a safe status, as indicated at block 924. The status returned by the image processing module is then communicated to the light emitting output, as indicated in FIG. 8.

Image detection similar to the process described in FIG. 9 may be applied to determine the speed of a rider using the output from multiple cameras.

Figure 10:
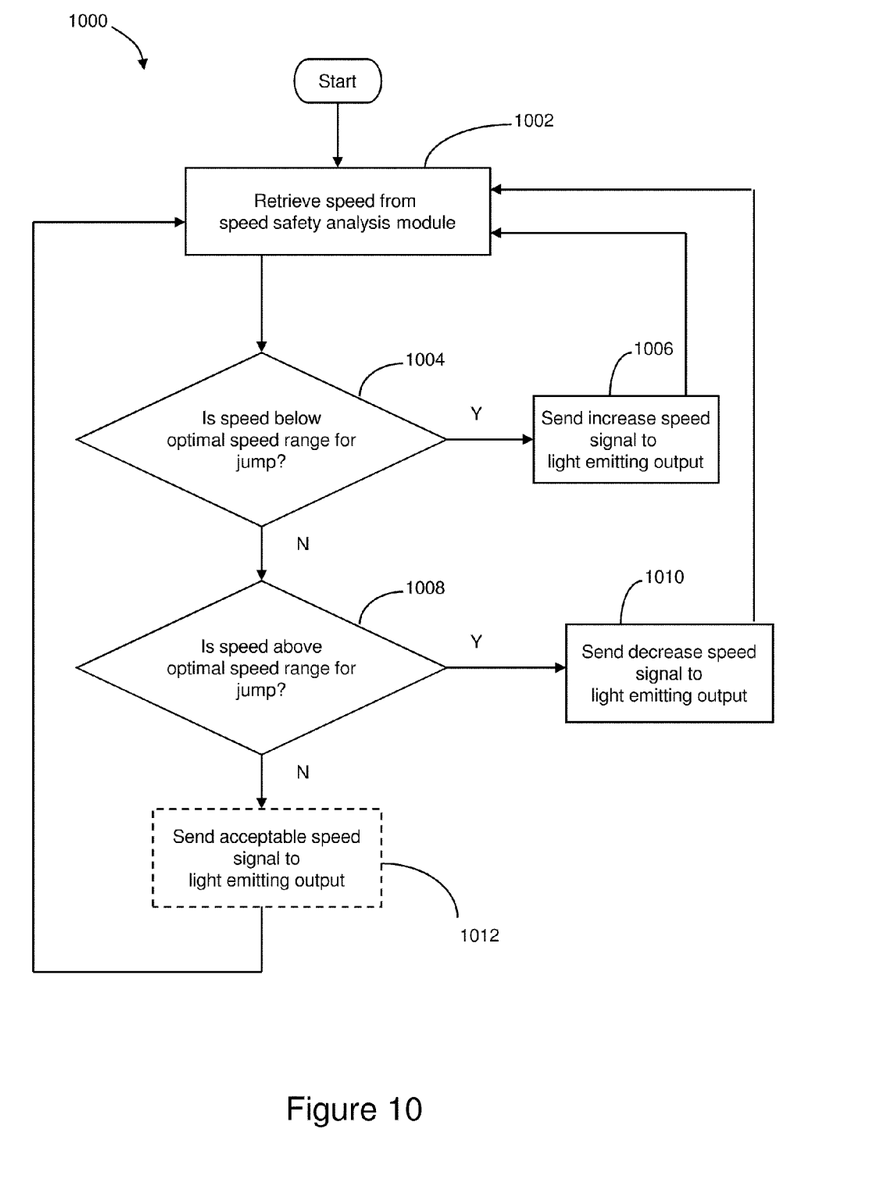
FIG. 10 shows a flow chart of an illustrative method for monitoring rider speed on an approach to a jump.

Referring to now to FIG. 10, there is shown a flow chart of an illustrative method 1000 for monitoring rider speed on an approach to a jump. By way of example and not of limitation, the illustrative method 1000 is associated with the speed safety analysis module, such as radar processing block 706 presented in FIG. 7. In another embodiment, the method uses image processing to determine the speed of the rider. The illustrative method is initiated at block 1002 where speed data from the speed safety analysis module is communicated to the computing device 208. The method then proceeds to decision diamond 1004, at which the speed data is analyzed. At decision diamond 1004, if the speed received at the computing device falls below an optimal speed range for the jump, an increase speed signal is sent to light emitting output 218, as indicated at block 1006. If the speed received at the computing device is not below an optimal speed range for the jump, the method proceeds to decision diamond 1008. At decision diamond 1008, if the speed received at the computing device falls above an optimal speed range for the jump, a decrease speed signal is sent to light emitting output 218, as indicated at block 1010. If the speed received at the computing device is not above an optimal speed range for the jump, the method may proceed to optional block 1012. At block 1012, an acceptable speed signal may be sent to the light emitting output.

In an alternative embodiment, a system using two cameras and image processing techniques may be used to determine the speed of the rider approaching the jump. For example, an image-based speed analysis module uses image analysis, such as the process indicated in FIG. 9, to determine whether a rider is present in the image recorded by a first camera. Image analysis is used to determine whether the same rider detected by the first camera is also detected by the second camera. The second camera is typically located closer to the jump than the first camera. The cameras may be mounted on monitoring stations such as station 104 shown in FIG. 1. Based on the known distance between the first camera and the second camera and the time between when the rider is detected at the first camera and the time when the rider is detected at the second camera, the speed of the rider may be determined. The calculated speed may then be used to determine whether the rider's speed on the approach to the jump falls within an optimal speed range for the jump.

It will be appreciated that the output produced by the image processing module and the speed safety analysis module may be used to enhance jump safety in ways beyond those described above. For example, when a signal indicating unsafe conditions is generated by the image processing module or the speed safety analysis module, ski patrol may be notified via the network.

In some embodiments, the output from one or more of the cameras may be routed to displays visible to ski patrol or other ski area personnel to allow ongoing monitoring of the jump areas.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A networked jump safety system for monitoring a landing area associated with a jump, the system comprising:
   a plurality of monitoring stations, wherein each monitoring station includes,
      a camera positioned to generate a camera output of the landing area,
      a monitoring station network interface device,
      a light emitting output that displays a status;
   a safety analysis station configured to communicate with the plurality of monitoring stations, wherein the safety analysis station includes,
      a safety analysis station network interface device, wherein the safety analysis station network interface device is communicatively coupled to each monitoring station network interface device,
      a memory configured to receive the camera output from each monitoring station with the safety analysis station network interface device,
      a processor configured to analyze the camera output from each monitoring station that is received in the memory,
      an image processing module controlled by the processor, the image processing module configured to communicate one of two statuses to the light emitting output of at least one monitoring station, in which the statuses include,
         a landing area clear status, when the landing area is clear of obstructions, and
         a landing area obstruction status, when there is an obstruction in the landing area.

2. The networked jump safety system of claim 1, wherein each monitoring station network interface device is communicatively coupled to the safety analysis station network interface device via a network cable.

3. The networked jump safety system of claim 1, wherein the safety analysis station network interface device includes a wireless access point and each monitoring station network interface device is a wireless client device communicatively coupled to the wireless access point.

4. The networked jump safety system of claim 3, further comprising a relay tower that includes a wireless repeater that relays signals between the wireless access point and the wireless client device.

5. The networked jump safety system of claim 1, wherein one of the monitoring stations includes a stationary tower.

6. The networked jump safety system of claim 1, wherein one of the monitoring stations includes a mobile monitoring station.

7. The networked jump safety system of claim 1, wherein the safety analysis station further comprises a long-term storage medium configured to store the camera output from each monitoring station.

8. The networked jump safety system of claim 1, wherein the safety analysis station further comprises a user interface configured to control the plurality of monitoring stations.

9. The networked jump safety system of claim 8, wherein pan, tilt and zoom of the camera are adjustable via the user interface for each monitoring station.

10. A networked jump safety method for monitoring a landing area associated with a jump, the method comprising:
    transmitting a camera output from a camera positioned to generate a camera output of the landing area, wherein the camera output is integrated with a monitoring station;
    receiving the camera output at a memory integrated with a safety analysis station that is configured to communicate with a network that includes a plurality of monitoring stations;
    analyzing the camera output from each monitoring station at the safety analysis station memory with a processor integrated with the safety analysis station;
    determining with an image processing module integrated with the safety analysis station that is controlled by the processor when an obstruction is detected in the landing area based on the monitoring station camera output;
    transmitting a status from the image processing module to a light emitting output corresponding to the monitoring station via the network; and
    indicating the status with the light emitting output at the monitoring station that there is an obstruction in the landing area.

11. The method of claim 10, wherein the network is a wired network.

12. The method of claim 10, wherein the network is a wireless network.

* * * * *